(12) United States Patent
Van Phan et al.

(10) Patent No.: US 11,228,937 B2
(45) Date of Patent: Jan. 18, 2022

(54) USER-PLANE ENHANCEMENTS SUPPORTING IN-BEARER SUB-FLOW QOS DIFFERENTIATION

(71) Applicant: Nokia Technologies Oy, Espoo (FI)

(72) Inventors: Vinh Van Phan, Oulu (FI); Ling Yu, Kauniainen (FI); Samuli Turtinen, Ii (FI); Anand Bedekar, Glenview, IL (US); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/741,941

(22) PCT Filed: Jun. 16, 2016

(86) PCT No.: PCT/FI2016/050435
§ 371 (c)(1),
(2) Date: Jan. 4, 2018

(87) PCT Pub. No.: WO2017/009525
PCT Pub. Date: Jan. 19, 2017

(65) Prior Publication Data
US 2018/0199228 A1    Jul. 12, 2018

(30) Foreign Application Priority Data

Jul. 16, 2015  (IN) .......................... 3646/CHE/2015

(51) Int. Cl.
*H04W 28/02*    (2009.01)
*H04W 72/12*    (2009.01)
(Continued)

(52) U.S. Cl.
CPC ....... *H04W 28/0268* (2013.01); *H04L 67/322* (2013.01); *H04L 69/18* (2013.01);
(Continued)

(58) Field of Classification Search
CPC ....... H04L 69/16; H04L 69/161; H04L 69/22; H04L 45/74; H04L 45/38; H04L 47/24; H04L 47/2483; H04L 47/6215
See application file for complete search history.

(56) References Cited

U.S. PATENT DOCUMENTS 8,588,189 B2    11/2013  Lee et al.
2007/0091900 A1  4/2007  Asthana et al.
(Continued)

FOREIGN PATENT DOCUMENTS

CN    101091359 A    12/2007
CN    102238743 A    11/2011
(Continued)

OTHER PUBLICATIONS

"Data Never Sleeps 2.0", DOMO, Retrieved on Dec. 19, 2017, Webpage available at : https://www.domo.com/learn/data-never-sleeps-2.
(Continued)

*Primary Examiner* — Asad M Nawaz
*Assistant Examiner* — Najeeb Ansari
(74) *Attorney, Agent, or Firm* — Harrington & Smith (57) ABSTRACT

Embodiments concern managing traffic in a radio device. While classifying user-plane packets from multiple applications according to quality of service requirements, a specific user-plane packet is classified as/determined to be a predetermined special-type packet (e.g., the special-type packets establish a new TCP/IP connection for a newly activated application). Based on that, that specific user-plane packet is mapped to a pre-defined radio bearer associated with a preconfigured priority, for example a highest priority among all bearers to which any of these user-plane packets from the multiple applications are mapped. Then all the mapped user-plane packets are scheduled for transmission according
(Continued)

to their respective priorities. For example, the specific user-plane packet could be a SDU having a SYN, SYN-ACK or ACK, and the network convergence sub-layer (NCS) constructs a L2 NCS PDU using a designated format with the SDU in the payload and context information in the header.

19 Claims, 7 Drawing Sheets

(51) Int. Cl.
    *H04L 29/08*     (2006.01)
    *H04W 80/02*     (2009.01)
    *H04L 29/06*     (2006.01)
    *H04W 80/06*     (2009.01)
    *H04W 72/10*     (2009.01)
    *H04W 76/10*     (2018.01)
    *H04L 12/851*     (2013.01)
    *H04L 12/863*     (2013.01)
    *H04W 88/10*     (2009.01)

(52) U.S. Cl.
    CPC ....... *H04W 28/0257* (2013.01); *H04W 72/10* (2013.01); *H04W 72/1242* (2013.01); *H04W 72/1263* (2013.01); *H04W 80/02* (2013.01); *H04W 80/06* (2013.01); *H04L 47/24* (2013.01); *H04L 47/6215* (2013.01); *H04W 76/10* (2018.02); *H04W 88/10* (2013.01)

(56) References Cited

U.S. PATENT DOCUMENTS

| | | | |
|---|---|---|---|
| 2008/0020775 A1 | 1/2008 | Willars | 455/445 |
| 2009/0268613 A1* | 10/2009 | Sagfors | H04L 29/06 370/235 |
| 2010/0316045 A1 | 12/2010 | Przybysz et al. | |
| 2012/0039337 A1* | 2/2012 | Jackowski | H04L 43/0894 370/392 |
| 2012/0099538 A1* | 4/2012 | Venkataswami | H04L 47/24 370/329 |
| 2013/0242720 A1* | 9/2013 | Chou | 370/221 |
| 2013/0294239 A1* | 11/2013 | Szabo | H04L 45/38 370/235 |
| 2014/0334326 A1* | 11/2014 | Zhang | H04W 24/08 370/252 |
| 2015/0009826 A1 | 1/2015 | Ma et al. | |
| 2015/0236959 A1* | 8/2015 | Cai | H04L 47/24 709/235 |
| 2015/0256454 A1* | 9/2015 | Schliwa-Bertling | H04L 45/74 370/392 |
| 2016/0112896 A1* | 4/2016 | Karampatsis | H04W 28/0252 370/230.1 |
| 2016/0248691 A1* | 8/2016 | Johansson | H04L 47/562 |
| 2016/0337372 A1* | 11/2016 | Togawa | H04L 63/0227 |
| 2017/0359450 A1* | 12/2017 | Kumar | H04L 63/123 |
| 2017/0374030 A1* | 12/2017 | Cooper | H04L 63/0209 |
| 2018/0063846 A1* | 3/2018 | Akin | G06F 15/16 |

FOREIGN PATENT DOCUMENTS

| | | |
|---|---|---|
| CN | 104396303 A | 3/2015 |
| EP | 1809055 A2 | 7/2007 |
| EP | 2815603 A1 | 12/2014 |
| WO | 2006/065024 A1 | 6/2006 |

OTHER PUBLICATIONS

"Make Data Useful", Gduchamp, Retrieved on Dec. 19, 2017, Webpage available at : http://www.gduchamp.com/media/StanfordDataMining.2006-11-28.pdf.

International Search Report and Written Opinion received for corresponding Patent Cooperation Treaty Application No. PCT/FI2016/050435, dated Aug. 22, 2016, 12 pages.

Extended European Search Report received for corresponding European Patent Application No. 16823939.0, dated Jan. 22, 2019, 10 pages.

Swami et al., "Cross-Layer Optimization of Transport Protocols over Wireless Networks", 3rd International Symposium on Wireless Pervasive Computing, May 7-9, 2008, pp. 241-245.

NTT Docomo; "Proposal on RAB and RB concept for E-UTRAN"; R3-060140; 3GPP TSG-RAN3#51, Denver, Colorado; Feb. 13-17, 2006; whole document (6 pages).

\* cited by examiner

USER-PLANE ENHANCEMENTS SUPPORTING IN-BEARER SUB-FLOW QOS DIFFERENTIATION

RELATED APPLICATION

This application was originally filed as PCT Application No. PCT/FI2016/050435 filed Jun. 16, 2016 which claims priority benefit from IN Patent Application No. 3646/CHE/2015 filed Jul. 16, 2015.

TECHNOLOGICAL FIELD

The described invention relates to wireless communications, and more particularly to reducing latency in setting up a new connection which can facilitate quality of service differentiation in wireless systems such as the 5G system currently under development.

BACKGROUND

When assessing the current state of data communications with a view towards setting goals and framework for developing the 5G wireless system from current LTE/LTE-A (Long Term Evolution/Long Term Evolution-Advanced) systems, it was identified that more than 90% of the current Internet traffic, including all popular social networking and multimedia sharing applications, is using TCP/IP (Transport Control Protocol/Internet Protocol). It follows that enhancing TCP performance in general, and QoS/QoE (Quality of Service/Quality of Experience) of TCP/IP based applications and services in particular, is an important design target for 5G networks.

TCP is a bidirectional end-to-end transport-layer connection between the data source and the data sink, and it has some well-known properties. While it exhibits a robust flow control, it generally starts slow, it is very sensitive to packet errors, it can have a high latency and poor RTT (round trip time). Allocating resources efficiently is important for the end user's QoE so that the communication sessions in progress can be allocated the highest quality commensurate with their content or type of communications (video, voice, online shopping, etc.) as limited by the available resources. Development of the 5G system is currently trending heavily towards an environment with a more a more thorough QoS awareness. While different applications such as voice, social networking, document exchange, streaming video, navigation and the like might be suitable for different QoS levels, 5G is also moving towards the concept of different sub-flows of a flow having different QoS limits. 5G contemplates the full vertical of the radio stack being QoS/QoE aware, with different QoS parameters for different sub-flows within a single service flow. QoS/QoE can then be enforced per user, per application, or per sub-flow, with differentiations within a given application and aggregation of same-QoS sub-flows across different applications. This represents a highly dynamic radio stack, and will require a highly flexible radio interface to handle such sub-flow level differentiation and aggregation.

Figure 1:
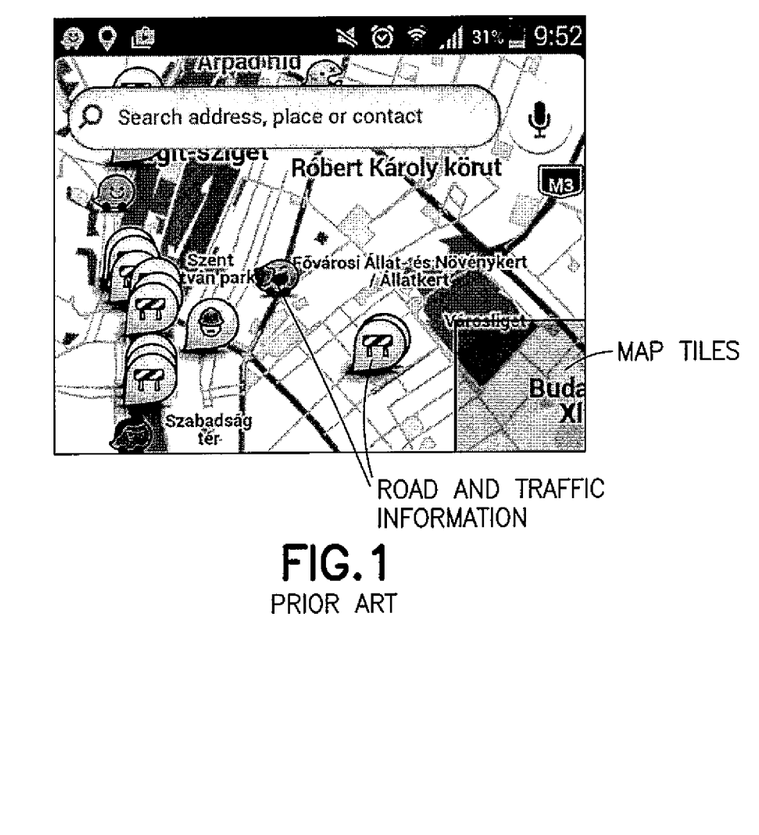
FIG. 1 is a screenshot of a navigation application running on a mobile terminal and illustrating different data that may be wirelessly communicated on different sub-flows with different Quality of Service requirements/parameters.

To illustrate the concept of QoS aware subflows, FIG. 1 is a screenshot of the Waze navigation application running on a mobile terminal. Waze is a community based social mapping and navigation application that displays map data in the area of the user's GPS-fixed and WLAN-refined position in addition to user-contributed traffic and hazard reports for real time display onscreen. The displayed map is constructed from map tiles that are downloaded via plaintext (HTTP) connections, and the contextual information such as the road and traffic information shown are downloaded via encrypted (HTTPS) connections. Consider the following with a view towards QoE management. For manual browsing where the user moves the map onscreen, the interactivity of the map tiles is the key for a good user experience so short download times for the map tiles becomes important. For live navigation it is the traffic information that is critical and the map tiles need to be supplied on-demand as the user proceeds to the next area, but the need for the next map tile can generally be anticipated with high confidence for most users who primarily use live navigation. Data needs in order to display traffic during navigation on a formerly visited area consists mostly of traffic and other context information since the map tiles are cached; in this case the traffic information is still critical. By profiling in real time the users patterns for how they interact with the app, the QoS/QoE can be managed more effectively; one pattern represents browsing the map manually (scrolling, zooming, searching, etc.), another pattern represents using live GPS navigation in a new area and a third pattern represents navigation in an already visited area. If the service flow to support this app is OTT/Internet (Over The Top/Internet) it might be suitable that it have two sub-flows, one for map tiles and the other for context information. These sub-flows can have different QoS parameters, and the QoS for the map-tile sub-flow for a pattern-1 user may be higher than the QoS for the same map-tile sub-flow for a pattern-3 user sitting in traffic, and so the QoE requirement of a given sub-flow may depend further on the specific user's current usage pattern.

Making such sub-flow differentiation by QoS possible in a practical communication system is one aspect of these teachings.

SUMMARY

According to one aspect of these teachings there is an apparatus comprising at least one processor and at least one non-transitory memory including computer program code. The at least one memory and the computer program code are configured with the at least one processor to cause the apparatus to: a) while classifying user-plane packets from multiple applications according to quality of service requirements, classify a specific user-plane packet is a predetermined special-type packet; b) map the classified specific packet to a pre-defined radio bearer associated with a highest priority as compared to all other radio bearers to which the other classified user-plane packets are mapped; and schedule the mapped specific packet and the other mapped user-plane packets for transmission according to their respective priorities.

According to another aspect of these teachings there is a method for managing traffic in a radio device, the method comprising: while classifying user-plane packets from multiple applications according to quality of service requirements, classifying a specific user-plane packet is a predetermined special-type packet; mapping the classified specific packet to a pre-defined radio bearer associated with a highest priority as compared to all other radio bearers to which the other classified user-plane packets are mapped; and scheduling the mapped specific packet and the other mapped user-plane packets for transmission according to their respective priorities.

According to a further aspect of these teachings there is a computer readable memory having stored therewith computer program code, which when executed controls a communication device to at least: a) while classifying user-plane packets from multiple applications according to quality of service requirements, classify a specific user-plane packet is a predetermined special-type packet; b) map the classified specific packet to a pre-defined radio bearer associated with a highest priority as compared to all other radio bearers to which the other classified user-plane packets are mapped; and c) schedule the mapped specific packet and the other mapped user-plane packets for transmission according to their respective priorities.

In a still further aspect of these teachings there is an apparatus comprising classifying means for classifying a specific user-plane packet as a predetermined special-type packet while classifying user-plane packets from multiple applications according to quality of service requirements; and mapping means for mapping the classified specific packet to a pre-defined radio bearer associated with a highest priority as compared to all other radio bearers to which the other classified user-plane packets are mapped; and scheduling means for scheduling the mapped specific packet and the other mapped user-plane packets for transmission according to their respective priorities.

These and other aspects are detailed below with particularity.

DETAILED DESCRIPTION

The inventors observed that TCP performance is particularly sensitive to latency associated with successful transmission of the first packets of the TCP connection. Those first packets are the ones associated with the connection establishment procedure, and in TCP they represent a three-way handshake: SYN, SYN-ACK, ACK. Typically these packets do not carry any actual payload and therefore they are quite small in size and packet length; often they are no larger than the length of the TCP packet header.

The Network Convergence Sub-layer of Layer 2 (NCS) in 5G is similar to packet data convergence protocol (PDCP) in E-UTRAN (Evolved UMTS Radio Access Network, commonly known as LTE). NCS in 5G is designated to be somewhat TCP/IP and application aware, and is able to monitor and filter out individual TCP/IP packets and sub-flows as well as carry context information of upper layers passed down to the NCS by corresponding upper layers such as the application scheduler and user gateway. NCS at the user equipment (UE) side is the first or earliest possible RAN-level (Radio Access Network) entity which may be configured to monitor and filter out individual application packets and service flows originated from the UE for the uplink (UL) traffic.

In view of the above, embodiments of these teachings provide an effective method for enhancing the transmission of targeted "special" user-plane (UP) packets such as the above 'first packets' of a TCP connection on the RAN level, as well as allowing for earliest possible triggers of possible in-bearer sub-flow QoS differentiation. In general terms the idea is to have a designated UL L2 priority queue (PQ) or radio bearer (RB) or logical channel (LC) set up and used for transmissions of all targeted user plane (UP) packets by targeted UEs in the UL. The priority queue may be considered a buffer in the UE's local memory that stores the packet to be sent; in the concept of QoS/QoE differentiated sub-flows within a flow the UE is expected to be operating with different per-subflow UL buffers and in this case the priority queue would be implemented as a per-sub-flow buffer for the designated/special UP packets. The same overall concept can similarly be applied for the downlink (DL) as well, so while the examples herein concern the UL these teachings also address the designation of certain DL UP packets for sub-flow QoS differentiation.

According to certain embodiments of these teachings it is the serving radio network that configures the active (e.g., not in idle mode) UE to set up and use a designated RB in UL for transmitting some specific UP packets such as those mentioned above. The serving radio network can alternatively configure the UE to set up and use a designated LC or PQ as above. In one embodiment these 'first packets' are characterized in that they establish corresponding TCP/IP based applications of the UE. Another class of 'special' packets that the network may designate for special treatment according to these teachings are Control protocol data units (PDUs) of the NCS to the serving RAN in UL (and from the serving RAN in DL). PDUs of a user-plane protocol may include control-type and data-type PDUs. Control-type PDUs do not contain user data or payload but rather control or configuration information relevant to the operation of the protocol between the peer entities. Control-type PDUs are generated by the user-plane protocol; i.e., originated and terminated in the protocol layer between the peer entities which in these examples are the UE and the radio network access node. The designated RB or LC or PQ is, for example, associated with the highest possible priority, as compared to the priority of other RBs used for transmissions of other or further UP data. While the priority of this designated RB may be higher than any other RB to which UP data is mapped, in some practical implementations the priority of that designated RB may still be lower than the priority of one or more RBs to which control-plane (CP) packets are mapped. More generally, there is a designated RB to which these 'first packets' are mapped and that designated RB has a preconfigured priority. The examples below have that preconfigured priority as higher than any other RB to which other UP packets from other applications are mapped.

Figure 2:
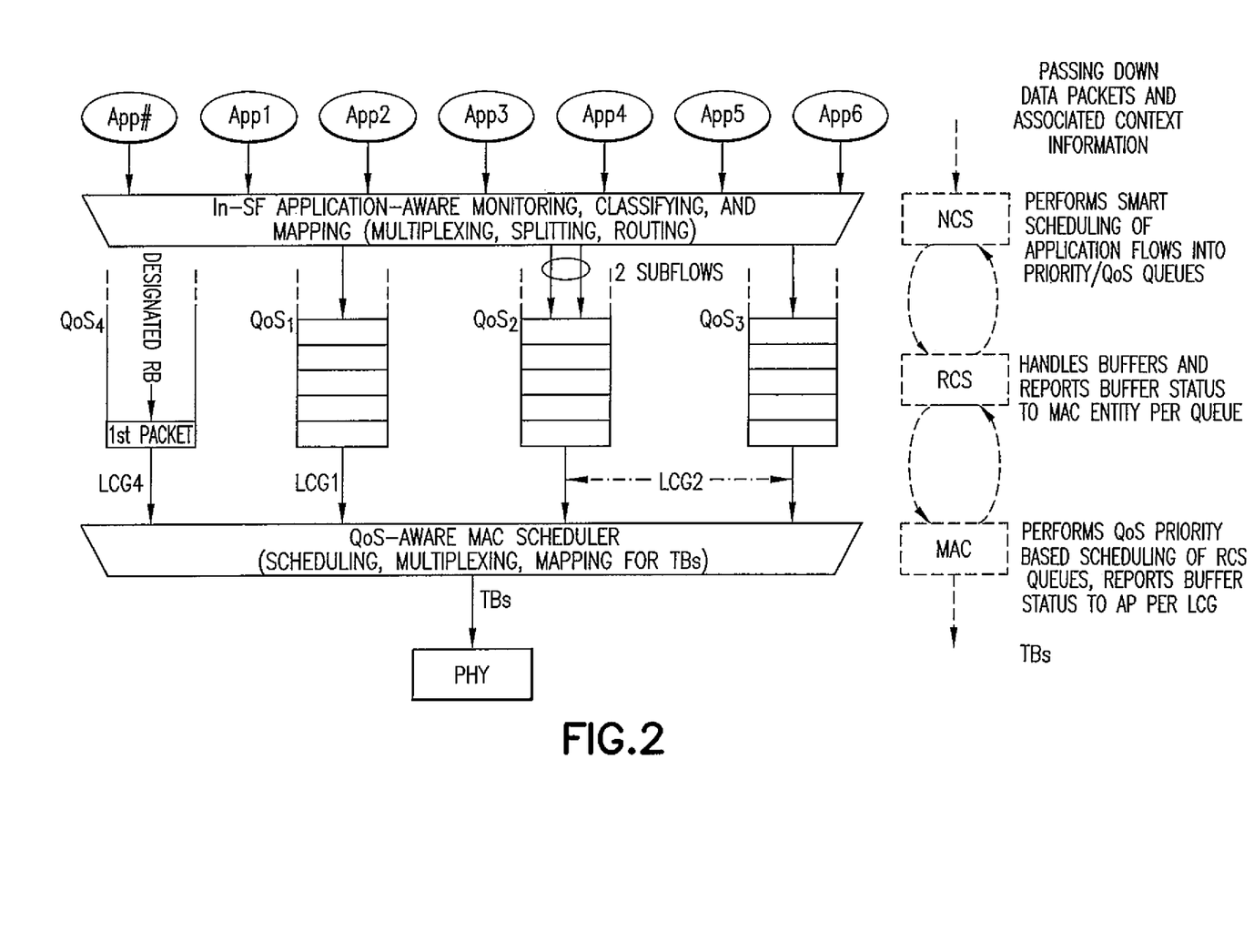
FIG. 2 is a diagram of a radio stack showing logical flows for different applications in a user equipment and illustrates how user-plane packets of a special-type get the highest priority of all user-plane packets according to embodiments of these teachings.

FIG. 2 is a diagram of a radio stack showing logical flows for packets from different applications in a UE and illustrates the designated UP packets being given the highest priority of all the user-plane data. To the right of FIG. 2 are the logical layers: NCS is the highest and PHY (physical layer) is the lowest at which the data is transmitted over the air. The NCS layer passes down data packets from the various applications App1, App2, etc., and performs smart scheduling of the application flows according to their respective priority/QoS queue. For clarity of description FIG. 2 also shows a Radio Convergence Sublayer (RCS) of layer 2 (similar to the Radio Link Control in E-UTRAN) that handles the buffers and reports the various buffer statuses (fill levels) to the MAC entity per queue. Each of the illustrated vertical columns on the RCS level represents a RCS entity or PQ or LC having a given QoS requirement ($QoS_1$, $QoS_2$, etc.), and $QoS_4$ is the highest priority among all the various QoS requirements for all the applications. Each LC is within (associated with) a predefined logical channel group (LCG1, LCG2, etc.), and in some cases different LCs with different QoS requirements can be within a single LCG as is shown for LCG2. For the case of two or more sub-flows aggregated and mapped on the same PQ or LC as shown for $QoS_2$ of LCG2, there may be separate buffers per sub-flow; in this case the QoS requirements for one of the sub-flows may be at the QoS limit of the service flow ($QoS_2$ of LCG2 for FIG. 2) while the QoS requirements for the other sub-flow is somewhat relaxed as compared to the service flow's QoS limit.

As an example of different QoS requirements on different sub-flows within the same service flow, consider the FIG. 1 navigation map example. For the case the user is in the live navigation pattern new map tiles will need to be supplied on-demand as the user proceeds to the next geographic area and so the map tile demands from the user's navigation app may be on the higher QoS subflow, but if instead the user has turned around and is now in a formerly visited area for which the map tiles are cached then that pattern would put the map tile demands from the user's navigation app on the lower QoS subflow. The QoS requirements are different but only marginally in this example and so they can be on different sub-flows within a given LC. In either case the context information, which is time sensitive in all cases, may go on a wholly different service flow with much tighter QoS constraints.

Each logical channel of FIG. 2 can be considered a different queue, and a different buffer though for the case of sub-flows there may be per-sub-flow buffers also. Each shaded block shown in the various logical channel buffers of FIG. 2 correspond to a user plane packet from the similarly-shaded application, so for example the lowermost packet shown in the $QoS_1$ buffer corresponds to a user packet from App1.

It is the NCS in 5G that monitors the various applications, classifies the UP packets from those applications, and maps the UP packets to the appropriate PQ/LC by means of multiplexing, splitting and routing these packets. Generally for peer-to-peer communications the NCS constructs its own control-type or data-type PDUs. In the examples herein the NCS would receive application packets from the applications themselves, which the NCS considers to be service data units, and construct NCS data-type PDUs with those application packets as payload. According to embodiments of these teachings, while classifying user-plane packets from those multiple applications according to QoS requirements, assume the NCS comes across one of the special-type packets discussed above by example. The special-type packets may be defined in the controlling wireless protocol/ standard and so both the UE and the network are able to uniformly recognize which UP packets are of the special-type, and in this regard the special-type or types are predetermined. For the case of FIG. 2 this specific packet matches App#, because in this example the specific packet is a first packet to establish a TCP/IP flow for App# which is being activated via that specific packet while the other numbered applications App1, App2 etc. are ongoing after having been initiated/activated previously. The NCS classifies that specific packet as a special-type packet and maps it to a pre-defined radio bearer, which is illustrated at the left of FIG. 2 as the $QoS_4$ column for which there is a designated RB. This designated RB is characterized as being associated with a highest priority as compared to all other radio bearers to which the other classified UP packets are mapped (e.g., $QoS_4$ is the highest QoS priority as compared to all other QoS service flows for all the other running applications).

In between the RCS and the PHY layer is the medium access control (MAC) layer at which the QoS-aware scheduling of packets for transmission over the air is done, and in 4G and 5G this scheduling involves mapping the UP packets to the transport blocks (TBs) before passing them to the PHY layer. The MAC scheduler maps the specific/special-type packet, as well as all the other mapped UP packets from all the other applications in FIG. 2, for transmission according to their respective priorities.

Figure 3A:
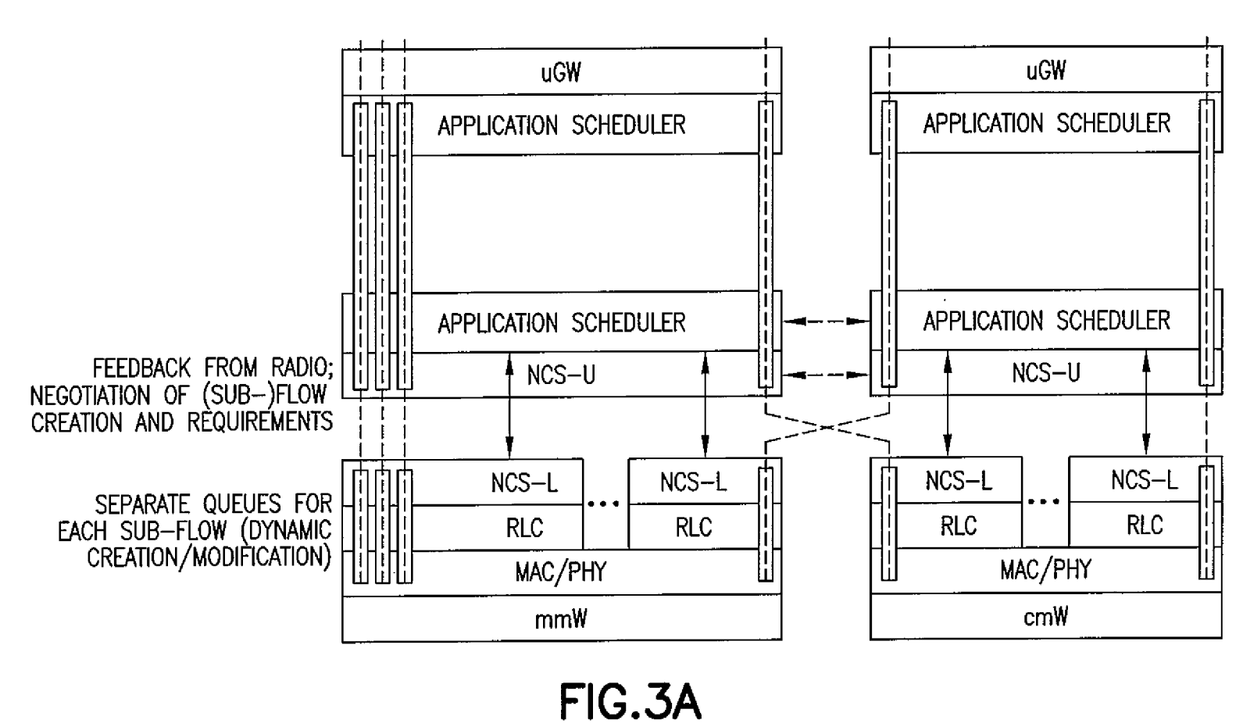
FIGS. 3A and 3B illustrate different logical arrangements for the application scheduler in the NCS layer in 5G, and can be used for implementing certain embodiments of these teachings.

The logical arrangement of the application scheduler (the NCS layer in 5G) can take various forms. In one embodiment shown at FIG. 3A there are separate queues for each different sub-flow, and these queues are dynamically created and modified as the different QoS sub-flows are built and dropped or changed. The physical buffers remain the same, but they are associated to different virtual queues that are logically created, modified and dropped according to their associated sub-flows. In this case the full vertical of the radio stack is QoS/QoE aware and so there can be sub-flow separation with different QoS/QoE parameters. The radio stack in this logical arrangement is capable of fulfilling strict requirements on the service (e.g., for machine-to-machine /M2M communications or for vehicle communications and telematics/V2X) due to its high dynamic capability and its high radio stack flexibility.

Figure 3B:
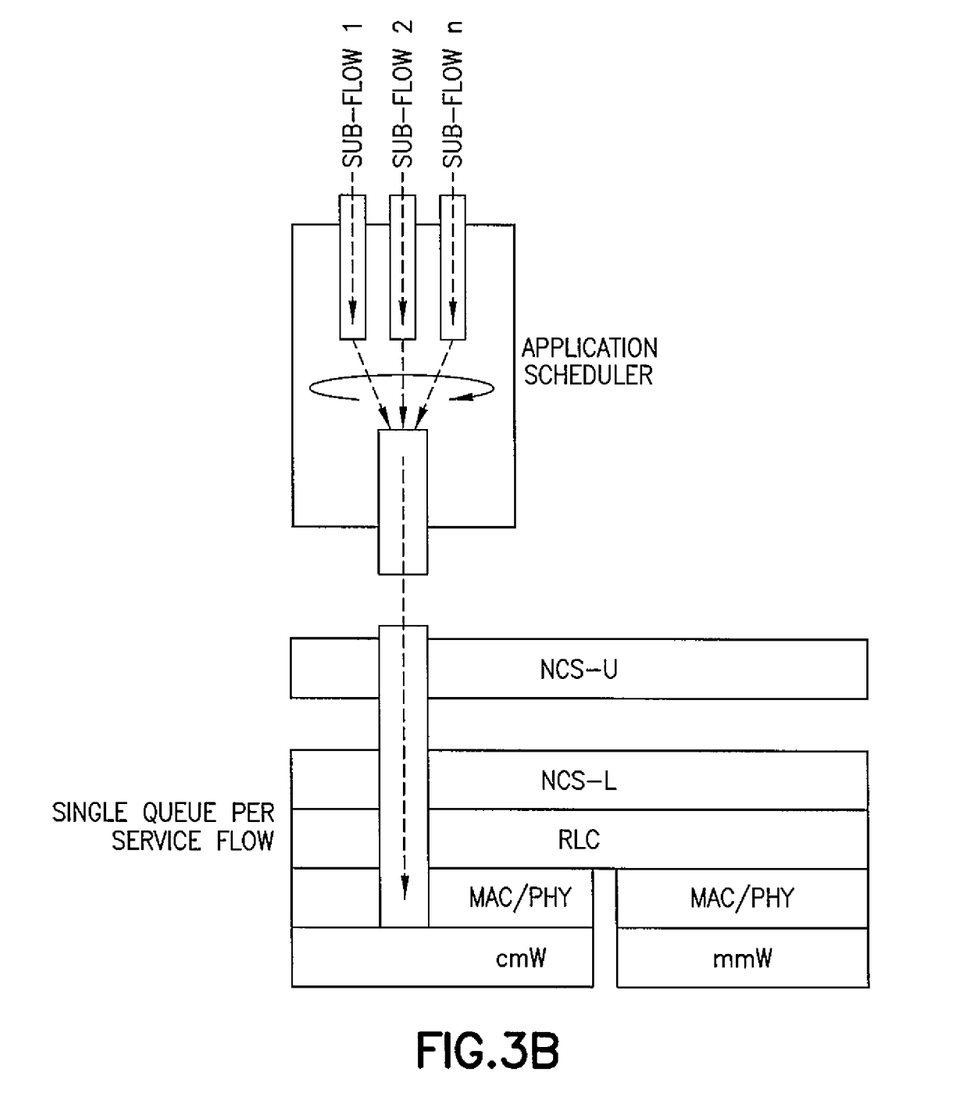

In another logical arrangement of the application scheduler shown at FIG. 3B there is a single queue per service flow and the application scheduler in the NCS layer handles the different sub-flows per queue. In this case there is intelligence at the application level but no sub-flow separation. The advantage is a reduced radio stack complexity, and this logical arrangement may be more suitable for OTT/ Internet category of service. FIG. 2 represents the single queue per service flow shown at FIG. 3B.

Whatever the logical arrangement of the radio stack, the end result of implementing the broader aspects of these teachings are the same; whenever the NCS scheduler, however implemented, recognizes a packet as being of the specified-type it maps that packet to the designated RB which has the highest priority as compared to all the other RBs to which user-plane packets/data are mapped. This highest UP priority is what reduces the latency in setting up a new TCP/IP connection as compared to conventional scheduling and radio stack protocols by reducing the round trip time in the SNY/SYN-ACK/ACK packet exchange between the application resident on the user's terminal/UE and the application's host server on the Internet. Furthermore, control information either in the header field of NCS Data PDUs or in NCS Control PDUs sent on the designated RB with shortest possible latency allows for fast in-band UP control including triggering the serving RAN for setting up new logical channel(s) or reconfiguring existing logical channels in both UL and DL to accommodate a new TCP/IP connection.

Figure 4:
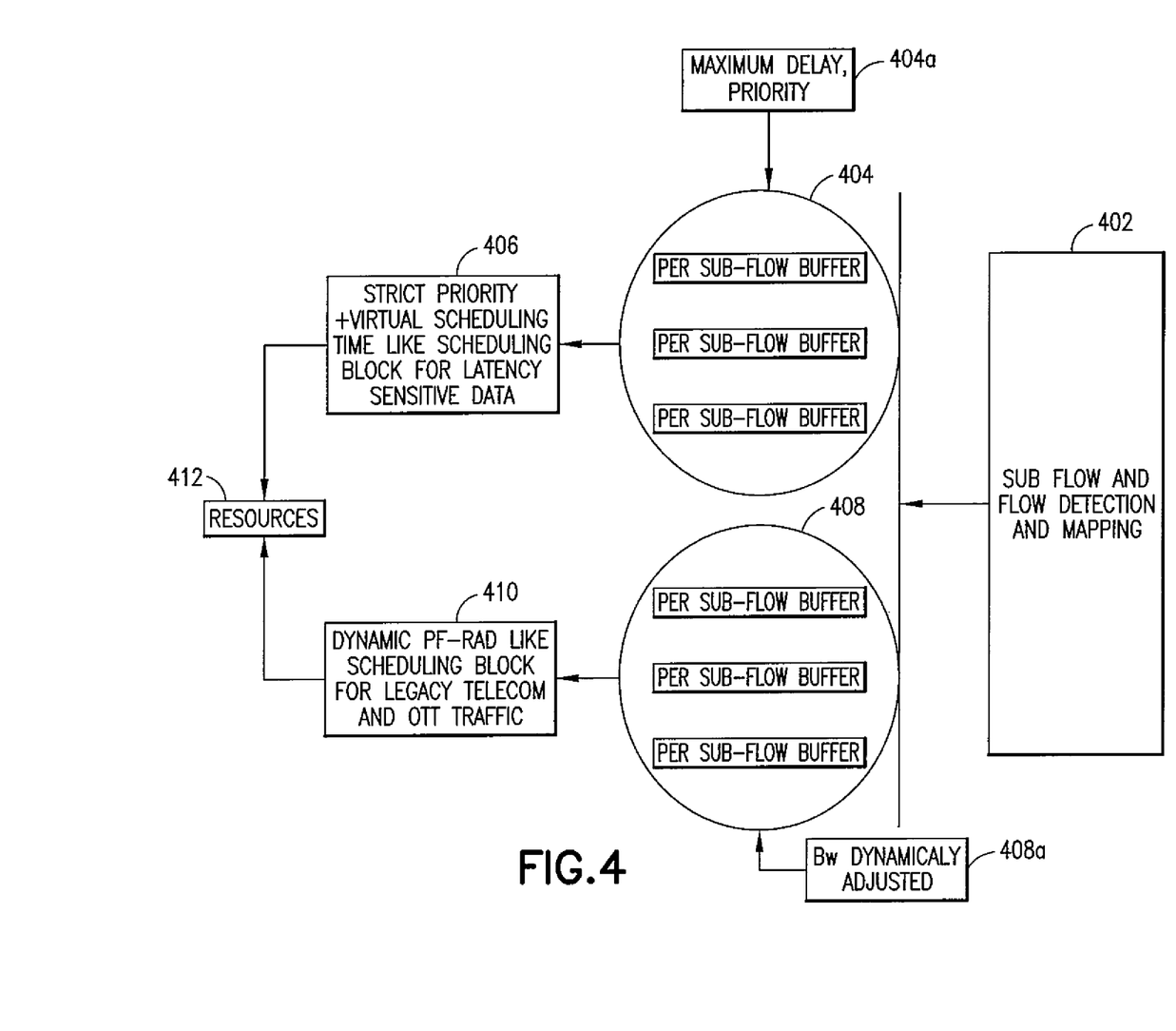
FIG. 4 is a block diagram illustrating a representative logical architecture of a radio stack suitable for carrying out these teachings.

FIG. 4 is a block diagram illustrating a representative 'architecture' of a radio stack suitable for carrying out these teachings. At the right is the NCS scheduler 402 which performs sub-flow detection and maps packets/PDUs to the different sub-flows. Here is where the packet will be recognized as being one of the pre-defined special-types of packets. In the radio device (which can be the UE or the radio access node) there are also a set of transmit buffers that for convenience of explanation we can consider as forming two groups, high priority buffers 404 for which the correspondingly associated QoS requirements are tight and lower priority buffers 408 for which the correspondingly associated QoS requirements are more relaxed. For the case of the higher priority buffers 404 the tight QoS requirements are given by example at 404a: there is a stipulated maximum delay and a priority which ranks each of these sub-flow buffers relative to the others. One of these sub-flow buffers represents the highest priority RB according to these teachings, and that is the sub-flow buffer to which all of the packets will be mapped/placed which the NCS scheduler 402 recognizes as being of the specified-type. This is true regardless of which application at the application layer originated the packet; if any given packet fits any on the pre-defined special-type list that packet gets mapped to the designated sub-flow buffer, and that designated sub-flow buffer has the highest priority amongst all the sub-flow buffers that get user-plane data. The MAC scheduler handles block 406 and 412, enforcing the strict priority at block 406 and setting up a virtual scheduling time that considers the maximum delay allowed for any latency sensitive data and mapping the PDUs in priority order to transport blocks or other radio resources at block 412.

For the case of the lower priority buffers 408 assume for simplicity they are all the same (relatively lower) priority and so the bandwidth they map to is dynamically adjusted as shown by block 408a depending on the buffer occupancy level or rate of the respective lower-priority sub-flow buffer. This data can be considered as mainly legacy telecom data and OTT traffic, and when scheduling this lower priority data for transmission the MAC scheduler can use dynamically scheduled blocks at block 410 before mapping to radio resources/transport blocks at 412 after the high priority user-plane data is mapped there. While the scheduling at block 410 is QoS aware, the lower priority data may be scheduled using a resource-sharing algorithm such as Proportional-Fair with Required Activity Detection (PF-RAD) that normally cannot support the highest QoS requirements.

Figure 5:
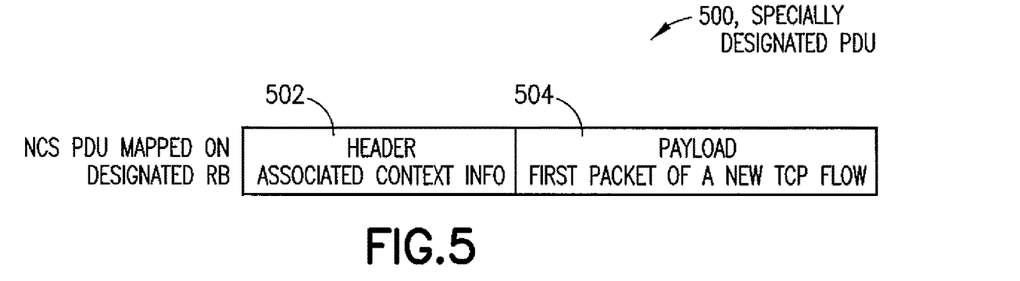
FIG. 5 is a PDU with a special-type format that automatically gets mapped to a designated radio bearer that has the highest priority among all the radio bearers that carry user-plane data, according to certain embodiments of these teachings.

In one particular embodiment of these teachings, for the special-type packet the Layer 2 (the NCS is a sub-set of layer 2 or L2) PDU format is designated or designed differently than the PDU formats of non-special-type packet PDUs. For example, the header (or other add-on element) of the PDU in the NCS layer corresponding to the special-type packet is designated to carry certain specified context information that is associated with the corresponding (new) TCP/IP flow of that special-type packet. This is particularly useful when the special-type packet is the kind that establishes a new TCP/IP flow, such as for example the SYN, SYN-ACK and ACK packets mentioned above. FIG. 5 is one example of such a L2 NCS PDU with the special-type format 500 that automatically gets mapped to the designated RB that has the highest priority among all the RBs that carry user-plane data; there is a header 502 bearing the context information and the payload 504 bears the special-type packet which in this case is the 'first' packet of a new TCP flow (e.g., the SYN, SYN ACK or ACK packets).

In one example the context information in the L2 PDU header is UE assistance information. Non-limiting examples of UE assistance information include application related type or QoS profile ID mapped or set by the UE (this may be based on information passed down from the application layer and/or preconfigured mapping rules/policies enforced at the NCS), source-sink direction indication, ranges of expected data volume or connection lifetime, and so forth. The specified context information may implicitly or explicitly indicate an identifier and initial mapping of the corresponding TCP flow on another established RB for subsequent TCP packets, e.g., it may specify an already configured RB/LC/PQ identifier or the said QoS profile which maps to an existing RB or if not the QoS profile triggers configuration of a new one.

Returning back to the FIG. 2 example, assume that the designated L2 NCS PDU that is in the designated RB at the left of that figure has a SYN as payload and context information in its header that maps to the already-established RB for the $QoS_3$ service flow. In this case what the designated L2 NCS PDU is telling the logical layers is that packets/PDUs on this new TCP/IP connection, which is being established by the SYN payload in that same L2 NCS PDU, should be mapped to the RB for the existing $QoS_3$ service flow. In this manner the context information in the header can be considered to be UE assistance information, and the network can take this into account when configuring the UE for this new flow as well as when creating this new TCP/IP flow and handling it.

Using the designated RB, the serving radio access network (RAN) is not only able to receive and deliver those targeted packets more quickly and reliably, but using the context information in the PDU header is also able to get desirable application-aware assistance information from the UE more quickly and reliably when it's actually needed. This can greatly aid the network side to detect, make decisions on and control the individual TCP flows with possible QoS differentiation in a fast and reliable manner without adding too much complexity to radio stack. For example, consider the NCS at the serving RAN upon receiving a PDU sent in the designated RB from the UE peer. The PDU is carrying a first TCP packet and further context information associated with the corresponding new TCP flow of the first packet. From that single PDU the RAN may have sufficient initial knowledge about the new TCP flow, for example identity, further application-aware context, initial RB mapping and QoS profile characteristics. From this initial information the serving RAN may decide and carry out any necessary reconfiguration, remapping or other treatment on the new TCP flow and the RB on which the new TCP flow is to be mapped and transmitted.

For the case in which the UE is engaged with multi-connectivity/multiple radio interfaces (e.g., in 5G it is anticipated there can be multiple serving cells per UE, and that a single UE can have simultaneous connections to multiple local access points), the network may decide to configure one designated priority RB for all the connections, or it may decide to configure separate ones per multi-connectivity leg/radio interface. The UE configured policy (e.g., which packets are the special-type packets and what is the priority of the designated RB relative to the RBs on which control plane data is sent) is controlled by the network, and this policy is what causes the UE to route the first packets to the designated RB which has a certain priority.

For the DL the same analogy may be applied. However, some of the associated application contexts in the above-mentioned UE assistance information (for example expected data volume or session lifetime) of the network-initiated flows in the DL may not be available at the NCS together with the first packets of new TCP flows. Instead, the network side NCS may include assigned identifier and QoS control information in the header of the L2 NCS PDUs sent on the designated RB in the DL, such as corresponding NCS-assigned sub-flow ID, priority setting or RB mapping instruction for the associated UL TCP flow. The serving radio network may use in-band UP NCS Control PDUs to configure and control the UE side for existing or new TCP flows of interest, as determined.

In the above examples the special-type packet was any of the 'first' packets for establishing a new TCP connection, namely any of the three-way handshake messages (SYN, SYN-ACK, and ACK), depending on whether the TCP connection was initiated by the UE or a peer entity in the radio network. But if the created TCP connection is DL only, for example with a high data rate demand, the network may decide not the remap the UL user-plane data associated with that DL flow to any other RB but may let the UE send TCP ACKs (acknowledgements) via the designated highest-priority RB.

There are a variety of ways to implement these teachings. In one embodiment, detailed configurations of the designated RB as well as triggering conditions for activating and using the designated RB at the UE side may be provided to the UEs as pre-configuration in advance. For example, the configurations of the designated RB can include RB-ID or LC-ID, security and QoS related parameters, rules and policies, RLC or RCS mode such as Acknowledgement Mode (AM) and related parameters, MAC buffer status report related parameters and triggers, and the like. Examples of triggering conditions for activating and using the designated RB at the UE side might include whether it can be initiated by the UE or has to be controlled by the serving radio access network whenever there is active TCP-based traffic, or whether the UE needs to belong to certain subscription priority class, or whether it can be used only for a specified service or application class, or that it can be used only when a specified monitored or measured condition is met, and so forth. This preconfiguration information may be provided to individually targeted UEs, or as serving-cell specific common control information broadcast in a system information block; or as dedicated control information sent to individual UEs using dedicated RRC signaling; or using any combination of these.

In another embodiment, the UL scheduling request or buffer status report from the UE relating to the designated RB may indicate to the serving radio access network that there is data to be sent on the designated RB. This indication may indicate the number of queuing data packets in the L2 buffer of the designated RB.

In a further embodiment, there are UL TCP feedback packets associated with some selected DL TCP data flows which may be transmitted using the designated RB in order to minimize TCP round trip time, thereby improving TCP performance. In this case the different PDU types with different formats may be introduced for carrying the 'first' packet, coupled with corresponding flow context information or TCP acknowledgements (ACKs).

While it is technically possible to use the high-priority UL RB that is configured for transmitting control-plane signaling to carry these special user-plane packets and thereby avoid an additional L2 queue or RB, this is not preferred in view of an overall network architecture of having very well-defined logical separation between user-plane and control-plane data, with certain context differences between the control and user planes.

By associating the designated RB with the highest user-plane priority for scheduling, and the fact that it is highly unlikely that there will be a large number of these special-type packets that might accumulate in the associated buffer, it is expected that there should not be a long queue with the designated RB. Furthermore, in-order in-sequence delivery is not anticipated to be an issue with the designated RB, at least from application layer perspective. Hence, a simple automatic-repeat-request (ARQ) scheme with a small window size may be sufficient for confirming packet delivery at the destination.

Figure 6:
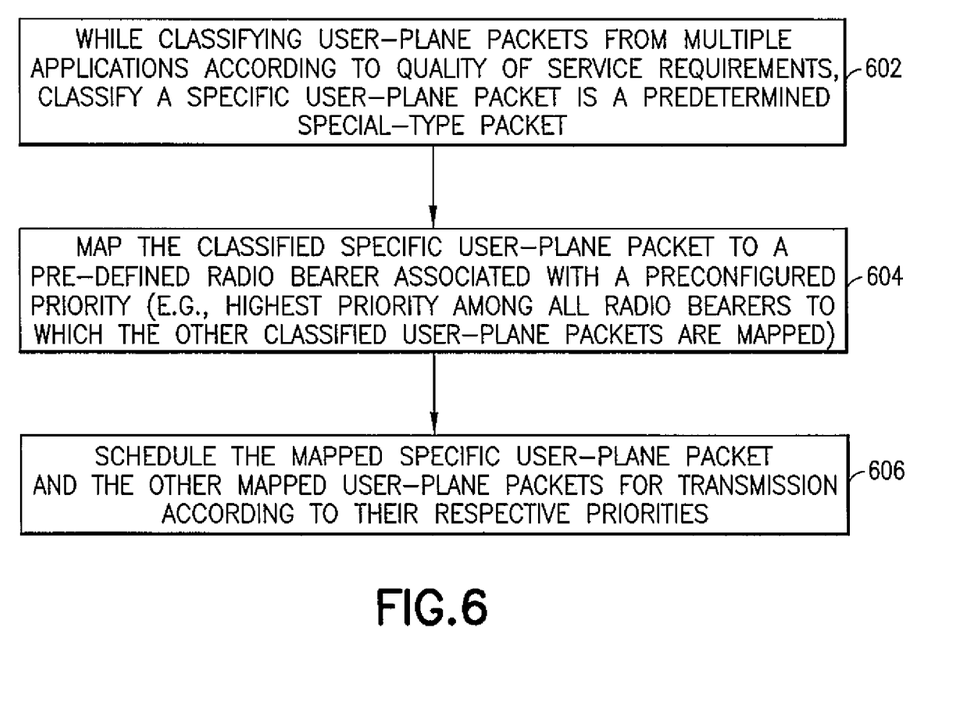
FIG. 6 is a logical flow diagram illustrating certain embodiments of these teachings.

FIG. 6 is a logical flow diagram that summarizes some of the above aspects of these teachings. The blocks of FIG. 6 and the expanded description below may be considered to represent actions taken by an apparatus such as a radio communication device (UE or access node), or specific portions of computer program code stored on a memory and readable/executable by a computer, or steps of a method. At block 602, while classifying user-plane packets from multiple applications (for example, the application packets/service data units the NCS receives from the active applications) according to quality of service requirements, the radio communication device classifies a specific user-plane packet or a NCS generated Control PDU is a predetermined special-type packet. More specifically for the examples above, the NCS of the radio device (which can be either the UE or the radio access node) classifies these user-plane packets using a NCS sub-layer peer-to-peer protocol, and both the UE and the radio access node apply that same protocol for classifying the user-plane packets they respectively handle. Then based on the classifying at block 602, at block 604 it maps the classified specific user-plane packet to a pre-defined radio bearer associated with a preconfigured priority, for example a highest priority as compared to all other radio bearers to which the other classified user-plane packets are mapped. Finally at block 606 it schedules the mapped specific user-plane packet and the other mapped user-plane packets for transmission according to their respective priorities. Specific logical circuitry for performing these functions is shown by example in the radio stacks at FIGS. 2, 3A and 3B, and also in the block diagram of FIG. 4 as well as FIG. 7 to be discussed below.

In one embodiment the predetermined special-type packet includes user-plane packets for establishing a connection for a newly activated application, and in the specific examples above the connection is a TCP/IP connection and the predetermined special-type packet includes a packet bearing any of a SYN, a SYN ACK and an ACK.

In another example above the predetermined priority associated with the pre-defined radio bearer is highest among priorities associated with any radio bearer to which the other classified user-plane packets from the multiple applications are mapped, or more generally highest among similar or relevant data traffic types (such as TCP/IP based applications) are mapped.

Also detailed above by example is the case in which the classified specific user-plane packet is mapped as a designated L2 NCS PDU to the pre-defined radio bearer, wherein the designated L2 NCS PDU has a designated format different from any format of any other of the classified user-plane packets as mapped to the respective other radio bearers. In this case the designated format of the designated L2 PDU is characterized as having the specific packet as payload and having context information as a header.

Specific examples of the context information includes one or more of the following: type of application the specific user-plane packet is initiating; an identifier for a quality of service profile; an indication of data source-data sink direction, a range of expected data volume; and a range of expected connection lifetime. The context information can also indicates an initial mapping of a corresponding TCP flow on another established RB with an NCS-assigned identifier for the corresponding TCP flow (NCS sub-flow) for (at least user-plane) packets subsequent to the specific user-plane packet that are not characterized as special-type packets.

Figure 7:
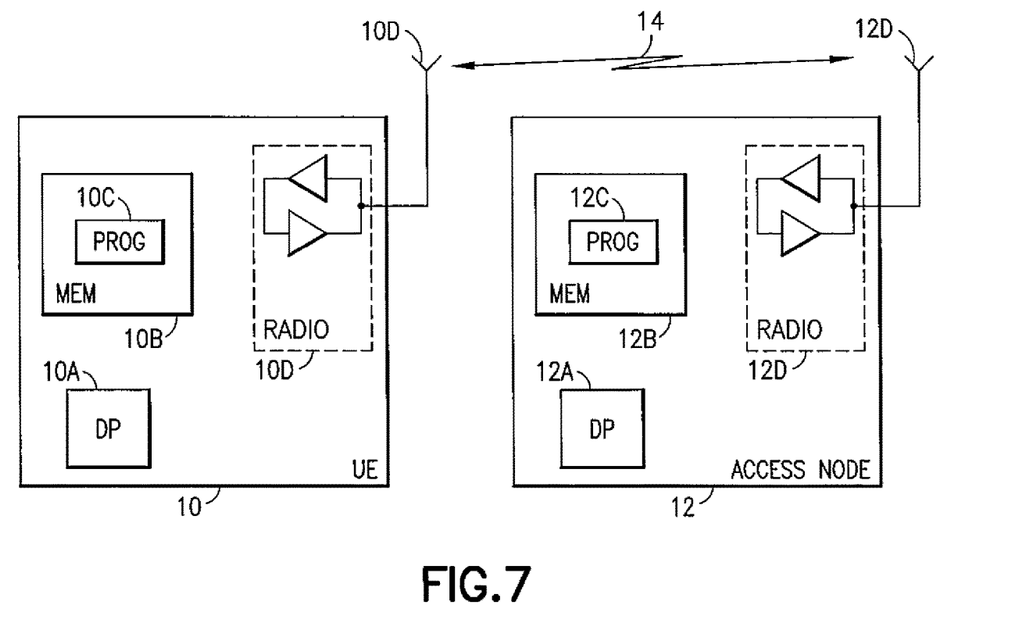
FIG. 7 is a schematic block diagram of radio communication devices suitable for carrying out embodiments of the teachings herein.

FIG. 7 is a schematic block diagram of radio communication devices suitable for carrying out embodiments of the teachings herein. In the illustrated wireless system a wireless network including an access node 12 is adapted for communication over a wireless link 14 with an apparatus, such as a mobile communication device which may be referred to as a UE 10. The network may include a network control element (NCE) that includes mobility management and serving gateway functionality, and which provides connectivity with another network such as a telephone network and/or a data communications network such as the internet.

The UE 10 includes a controller, such as a computer or a data processor (DP) 10A, a computer-readable memory medium embodied as a memory (MEM) 10B that stores a program of computer instructions (PROG) 10C, and a suitable wireless interface such as radio 10D (shown as a transmitter and receiver) for bidirectional wireless communications with the access node 12 via one or more antennas 10D.

Similarly the access node 12 also includes a controller, such as a computer or a data processor (DP) 12A, a computer-readable memory medium embodied as a memory (MEM) 12B that stores a program of computer instructions (PROG) 12C, and a suitable wireless interface such as a radio 12D (shown as a transmitter and receiver) for bidirectional wireless communications with the UE 10 via one or more antennas 12D. The access node 12 may be coupled via a data/control path to the NCE (not shown) as well as to other access nodes via similar peer data/control paths.

At least one of the PROGs 10C, 12C is assumed to include program instructions that, when executed by the associated DP, enable the device to operate in accordance with exemplary embodiments of this invention, as detailed above by example. That is, various exemplary embodiments of this invention may be implemented at least in part by computer software executable by the DP 10A of the UE 10; by the DP 12A of the access node 12, and/or by the DP of the NCE (not shown), or by hardware, or by a combination of software and hardware (and firmware). The NCE is assumed to have a DP, MEM and PROG as discussed above, and to communicate to the access node 12 via a modem and the data/control path or interface.

For the purposes of describing various exemplary embodiments in accordance with this invention the UE 10 and the access node 12 may also include dedicated processors, for example in the radio 10D/12D or elsewhere. Such dedicated modules may be constructed so as to operate in accordance with various exemplary embodiments detailed herein.

The DPs 10A and 12A may be of any type of circuitry comprising interconnected logical gates that is suitable to the local technical environment, and may include one or more of general purpose computers, special purpose computers, microprocessors, digital signal processors (DSPs) and processors based on a multicore processor architecture, as non-limiting examples. The wireless interfaces (e.g., radios 10D and 12D) may be of any type suitable to the local technical environment and may be implemented using any suitable communication technology such as individual transmitters, receivers, transceivers or a combination of such components.

In general, the various embodiments of the UE 10 can include, but are not limited to, smart phones whether handheld, wearable on the body or implantable within the user's body in whole or in part; other cellular telephones; personal digital assistants (PDAs) having wireless communication capabilities; portable computers having wireless communication capabilities including laptops, palmtops, tablets and e-readers; image capture devices such as digital cameras having wireless communication capabilities; gaming devices having wireless communication capabilities; music storage and playback appliances having wireless communication capabilities; Internet appliances permitting wireless Internet access and browsing; as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. Any combination of one or more computer readable medium(s) may be utilized as a memory 10B/12B. The computer readable medium may be a computer readable signal medium or a non-transitory computer readable storage medium. A non-transitory computer readable storage medium does not include propagating signals and may be, for example, but not limited to: an electronic, magnetic, optical, electromagnetic, infrared, or semiconductor system, apparatus, or device; or any suitable combination of the foregoing. A more specific but non-exhaustive list of examples for the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. A user equipment comprising:
   at least one processor; and
   at least one memory including computer program code, the at least one memory and the computer program code configured, with the at least one processor, to cause the user equipment to;
   classify user-plane packets from multiple applications according to quality of service requirements;
   classify a specific one of said user-plane packets as a packet of a predetermined special type;

map the classified specific one of said user-plane packets to a pre-defined radio bearer associated with a preconfigured priority;

map at least one user-plane packet other than the predetermined special type to at least one further radio bearer; and schedule the mapped specific one of said user-plane packets and the at least one user-plane packet other than the predetermined special type for transmission according to their priorities.

2. The user equipment according to claim 1, wherein the packet of a predetermined special type is a user-plane packet for establishing a connection for a newly activated application.

3. The user equipment according to claim 2, wherein the connection is a TCP/IP connection and the packet of a predetermined special type is a packet bearing any of a SYN, a SYN ACK and an ACK.

4. The user equipment according to claim 1, wherein the preconfigured priority is a highest priority among priorities associated with any radio bearer to which the other classified user-plane packets from the multiple applications are mapped.

5. The user equipment according to claim 1, wherein the classified specific one of said user-plane packets is mapped as a designated L2 network convergence sub-layer (NCS) packet data unit (PDU) to the pre-defined radio bearer, and wherein the designated L2 NCS PDU has a designated format different from any format of any other of the classified user-plane packets as mapped to other radio bearers.

6. The user equipment according to claim 5, wherein the designated format of the designated L2 NCS PDU is characterized as having the specific one of said user-plane packets as payload and having context information as a header.

7. The user equipment according to claim 6, wherein the context information includes at least one of:
type of application the specific one of said user-plane packets is initiating;
an identifier for a quality of service profile;
an indication of data source-data sink direction;
a range of expected data volume; and
a range of expected connection lifetime.

8. The user equipment according to claim 6, wherein the context information indicates an initial mapping of a corresponding TCP flow on another established radio bearer (RB) with a network convergence sub-layer (NCS)-assigned identifier for the corresponding TCP flow or NCS sub-flow for packets subsequent to the specific one of said user-plane packets that are not characterized as special-type packets.

9. A method comprising:
classifying user-plane packets from multiple applications according to quality of service requirements;
classifying a specific one of said user-plane packets as a packet of a predetermined special type;
mapping the classified specific one of said user-plane packets to a pre-defined radio bearer associated with a preconfigured priority;
mapping at least one user-plane packet other than the predetermined special type to at least one further radio bearer; and
scheduling the mapped specific one of said user-plane packets and the at least one user-plane packet other than the predetermined special type for transmission according to their priorities,
wherein the method is performed by a user equipment.

10. The method according to claim 9, wherein the packet of a predetermined special type is a user-plane packet for establishing a connection for a newly activated application, and wherein the preconfigured priority is a highest priority among priorities associated with any radio bearer to which the other classified user-plane packets from the multiple applications are mapped.

11. The method according to claim 9, wherein the classified specific one of said user-plane packets is mapped as a designated L2 network convergence sub-layer (NCS) packet data unit (PDU) to the pre-defined radio bearer, and wherein the designated L2 NCS PDU has a designated format different from any format of any other of the classified user-plane packets as mapped to other radio bearers.

12. The method according to claim 11, wherein the designated format of the designated L2 NCS PDU is characterized as having the specific one of said user-plane packets as payload and having context information as a header.

13. A non-transitory computer-readable memory having stored therein computer program code, which, when executed, controls a user equipment at least to:
classify user-plane packets from multiple applications according to quality of service requirements;
classify a specific one of said user-plane packets as a packet of a predetermined special type;
map the classified specific one of said user-plane packets to a pre-defined radio bearer associated with a preconfigured priority;
map at least one user-plane packet other than the predetermined special type to at least one further radio bearer; and
schedule the mapped specific one of said user-plane packets and the at least one user-plane packet other than the predetermined special type for transmission according to their priorities.

14. The non-transitory computer-readable memory according to claim 13, wherein the packet of a predetermined special type is a user-plane packet for establishing a connection for a newly activated application, and wherein the preconfigured priority is a highest priority among priorities associated with any radio bearer to which the other classified user-plane packets from the multiple applications are mapped.

15. The non-transitory computer-readable memory according to claim 14, wherein the connection is a TCP/IP connection and the packet of a predetermined special type is a packet bearing any of a SYN, a SYN ACK and an ACK.

16. The non-transitory computer-readable memory according to claim 13, wherein the classified specific one of said user-plane packets is mapped as a designated L2 network convergence sub-layer (NCS) packet data unit (PDU) to the pre-defined radio bearer, and wherein the designated L2 NCS PDU has a designated format different from any format of any other of the classified user-plane packets as mapped to other radio bearers.

17. The non-transitory computer-readable memory according to claim 16, wherein the designated format of the designated L2 NCS PDU is characterized as having the specific one of said user-plane packets as payload and having context information as a header.

18. The non-transitory computer-readable memory according to claim 17, wherein the context information includes at least one of:
type of application the specific one of said user-plane packets is initiating;
an identifier for a quality of service profile;

an indication of data source-data sink direction;
a range of expected data volume; and
a range of expected connection lifetime.

19. The non-transitory computer-readable memory according to claim 17, wherein the context information indicates an initial mapping of a corresponding TCP flow on another established radio bearer (RB) with a network convergence sub-layer (NCS)-assigned identifier for the corresponding TCP flow or NCS sub-flow for packets subsequent to the specific one of said user-plane packets that are not characterized as special-type packets.

* * * * *